(12) United States Patent
Carpino, II et al.

(10) Patent No.: US 10,994,849 B2
(45) Date of Patent: May 4, 2021

(54) AIRCRAFT ICE PROTECTION CONTROL SYSTEM PREHEAT LOGIC

(71) Applicant: Goodrich Corporation, Charlotte, NC (US)

(72) Inventors: Richard J. Carpino, II, Canton, OH (US); Alex Zadell, Willoughby, OH (US)

(73) Assignee: Goodrich Corporation, Charlotte, NC (US)

( * ) Notice: Subject to any disclaimer, the term of this patent is extended or adjusted under 35 U.S.C. 154(b) by 310 days.

(21) Appl. No.: 16/238,406

(22) Filed: Jan. 2, 2019

(65) Prior Publication Data

US 2020/0207479 A1   Jul. 2, 2020

(51) Int. Cl.
*B64D 15/22*   (2006.01)
*B64D 15/12*   (2006.01)

(52) U.S. Cl.
CPC ............. *B64D 15/22* (2013.01); *B64D 15/12* (2013.01)

(58) Field of Classification Search
CPC ......... B64D 15/22; B64D 15/12; B64D 15/20
See application file for complete search history.

(56) References Cited

U.S. PATENT DOCUMENTS

| | | | | |
|---|---|---|---|---|
| 8,430,359 B2* | 4/2013 | Al-Khalil | ............... | B64D 15/14 244/134 A |
| 8,550,402 B2 | 10/2013 | Houlihan et al. | | |
| 8,711,008 B2* | 4/2014 | Cook | ..................... | G01K 13/02 340/962 |
| 9,056,684 B2 | 6/2015 | McCollough et al. | | |
| 9,745,070 B2 | 8/2017 | Brouwers et al. | | |
| 2013/0228653 A1* | 9/2013 | Breer | ................... | B64D 15/163 244/134 D |
| 2014/0037446 A1* | 2/2014 | Garnett | .................. | B64D 15/22 416/1 |
| 2014/0191083 A1* | 7/2014 | Carpino, II | ............ | B64D 15/22 244/134 D |
| 2015/0336676 A1 | 11/2015 | McCann et al. | | |

FOREIGN PATENT DOCUMENTS

EP   2692640 A2   2/2014

OTHER PUBLICATIONS

14 CFR 25.1419, "Ice Protection," published by Government Publishing Office, Jan. 1, 2002.
Extended European Search Report dated May 26, 2020, received for corresponding European Application No. 19220202.6, 11 pages.

* cited by examiner

*Primary Examiner* — Brian M O'Hara
(74) *Attorney, Agent, or Firm* — Kinney & Lange, P.A.

(57) ABSTRACT

An ice protection system for controlling icing on an aircraft surface includes an OAT sensor configured to provide a signal indicative of an OAT, a LWC detector configured to provide a signal indicative of a LWC, an electrothermal device located on the aircraft surface, and an electronic control system configured to determine a critical temperature (TC) at or below which an anti-icing system will be used to preheat the aircraft surface, supply an electrical power having a calculated power level to the electrothermal device, and calculate the power level as being: zero if OAT>TC and LWC=0, controlled based on OAT and LWC if OAT>TC and LWC>0, controlled based on OAT and LWC if OAT<TC and LWC>0, and controlled based on OAT if OAT<TC and LWC=0.

20 Claims, 7 Drawing Sheets

AIRCRAFT ICE PROTECTION CONTROL SYSTEM PREHEAT LOGIC

BACKGROUND

An aircraft typically includes one or more ice protection systems for its surfaces which are susceptible to icing during flight. In an electrothermal anti-icing system, an electrothermal device converts electrical energy into heat to maintain the aircraft surface at a temperature above the freezing point of water. Ice protection systems of the prior art can control ice build-up on various surfaces by periodically or continuously measuring the temperature at or near the surface by one or more temperature sensors, and then regulating the electrothermal device accordingly in order to maintain the monitored surface temperature above the freezing point of water. A tail rotor on a rotary wing aircraft can present a particular challenge for the instrumentation needed to couple the temperature sensors which are located on the rotor blades to the controller for the ice protection system. A typical system can include one or more temperature detector probes on or near surfaces of the tail rotor, with electrical connections to the ice protection system being made by a series of electrical slip rings and brushes. Such an equipment configuration can be prone to erroneous operation and/or failure, and can therefore require increased maintenance.

In order to address this challenge, ice protection systems have been designed that provide a power level to electrothermal devices based on the sensing of environmental parameters external to the aircraft (instead of sensing the surface temperature of the protected surface), with outside air temperature and liquid water content being environmental parameters that can be used. In a typical ice protection system of the prior art, electrical power is provided to the electrothermal devices only when the outside air temperature is below about 1.7° C. (35° F.) and liquid water content is present. Accordingly, when the outside air temperature is below about 1.7° C. (35° F.) and liquid water content is detected, the ice protection system responds by providing power to the electrothermal devices. However in some situations, for example, when the outside air temperature is significantly below the freezing point of water, an appreciable period of time can elapse before the electrothermal devices raise the surface temperature of the protected surface above the freezing point. During this elapsed time, ice accretion on the protected surfaces can result in an undesirable mass of ice formation before the ice is removed by the ice protection system.

SUMMARY

A method of supplying power from an electronic control system to an electrothermal device on an aircraft surface to control icing on the aircraft surface includes determining a critical temperature (TC) at or below which an anti-icing system will be used to preheat the aircraft surface, sensing an outside air temperature with an outside air temperature (OAT) sensor, detecting an outside liquid water content (LWC) with an LWC detector, and supplying electrical power having a calculated power level to the electrothermal device under control of the electronic control system, the calculated power level being: zero if OAT>TC and LWC=0, controlled based on OAT and LWC if OAT>TC and LWC>0, controlled based on OAT and LWC if OAT<TC and LWC>0, and controlled based on OAT if OAT<TC and LWC=0.

An ice protection system for controlling icing on an aircraft surface includes an OAT sensor configured to provide a signal indicative of an OAT, a LWC detector configured to provide a signal indicative of a LWC, an electrothermal device located on the aircraft surface, and an electronic control system configured to determine a critical temperature (TC) at or below which an anti-icing system will be used to preheat the aircraft surface, and supply an electrical power having a calculated power level to the electrothermal device, the calculated power level being: zero, if zero if OAT>TC and LWC=0, controlled based on OAT and LWC if OAT>TC and LWC>0, controlled based on OAT and LWC if OAT<TC and LWC>0, and controlled based on OAT if OAT<TC and LWC=0.

DETAILED DESCRIPTION

Ice protection systems of the prior art can be used for removing ice build-up from external surfaces of aircraft, with the ice build-up typically caused by the accretion of ice as the aircraft encounters liquid water content (LWC) in temperatures below the freezing point of water. These systems can receive information from a LWC detector on the exterior of the aircraft, and also from a temperature probe on the exterior of the aircraft that measures outside air temperature (OAT). Indications of OAT and LWC can be used for other purposes aboard an aircraft as well. As used in this disclosure, LWC is generally referred to as a unitless variable, with process steps in various embodiments requiring an indication of either the presence or absence of LWC (i.e., LWC>0, or LWC=0, respectively). In disclosing a quantitative value of LWC, typical units of measure will be g/m$^3$. Moreover, as used in this disclosure, "freezing point" refers to the freezing point of water under a particular condition. It is to be appreciated that the freezing point is approximately 0° C. (32° F.) under most conditions, but this can change under some conditions. For example, pressure (i.e., altitude) and/or the presence of impurities can affect the freezing point.

Figure 1A:
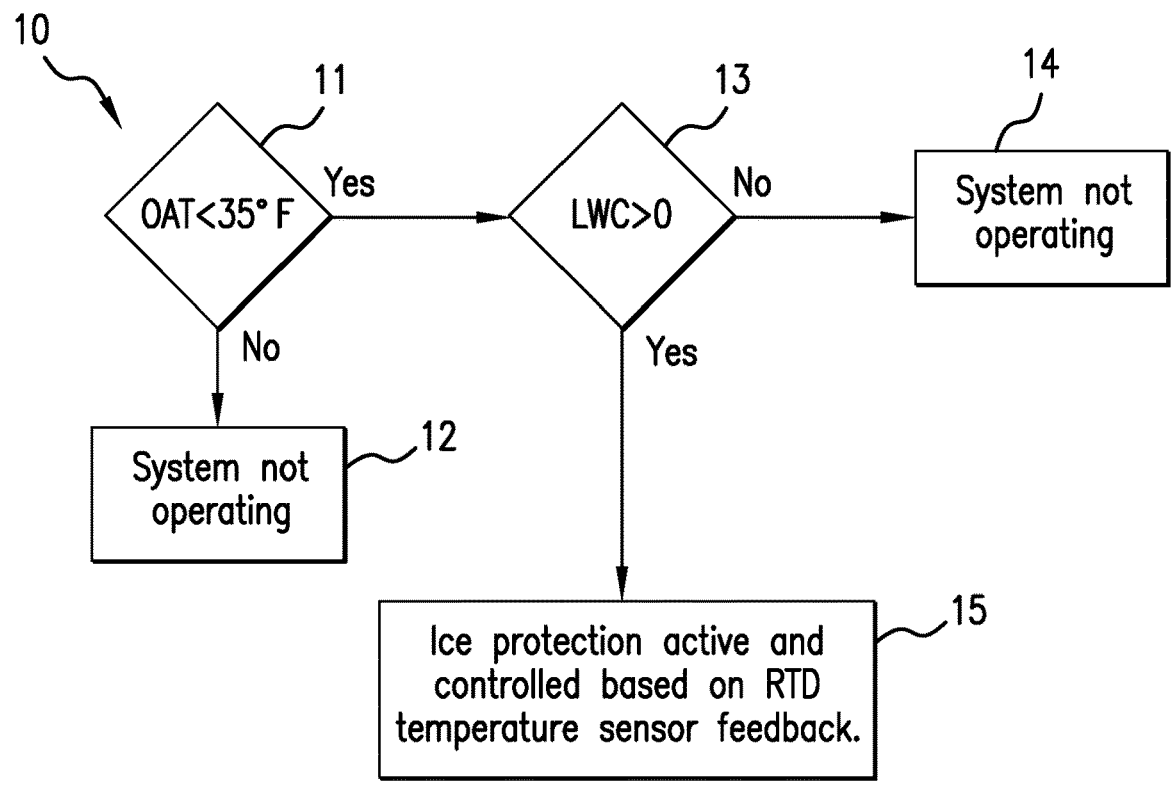
FIG. 1A is a process flow chart depicting an ice protection system of the prior art.

FIG. 1A is a process flow chart depicting an ice protection system of the prior art that uses a surface temperature detector. Shown in FIG. 1 are surface temperature detector ice protection flowchart 10, and the following steps: OAT decision step 11, system not operating step 12, LWC decision step 13, system not operating step 14, and system operating step 15. In the illustrated embodiment, surface temperature detector ice protection flowchart 10 depicts an ice protection system that measures the surface temperature of a protected surface by an embedded resistance temperature detector (RTD) probe for controlling electrothermal devices on the protected surface. Ice protection system operation depends on the input from external sensors which provide indications of OAT and LWC. In OAT decision step 11, if (OAT<35° F. (1.7° C.)) is false (i.e., OAT≥35° F. (1.7° C.)), the ice protection system invokes system not operating step 12 because it is assumed that ice will not form at or above 35° F. (1.7° C.). However, if OAT<35° F. (1.7° C.), then LWC decision step 13 evaluates whether LWC is present. If LWC=0, the ice protection system invokes system not operating step 14 because it is assumed that ice will not form in the absence of LWC. However, if LWC>0, the ice protection system invokes system operating step 15 to perform de-icing of the protected surface. In system operating step 15, the ice protection system provides a value of electrical power to electrothermal devices on the protected surface as necessary to maintain the measured temperature of the protected surface at a point above the freezing point of water, thereby de-icing the protected surface. In a typical embodiment, the ice protection system can energize and de-energize the electrothermal devices as necessary to maintain the measured temperature of the protected surface at a particular temperature.

Figure 1B:
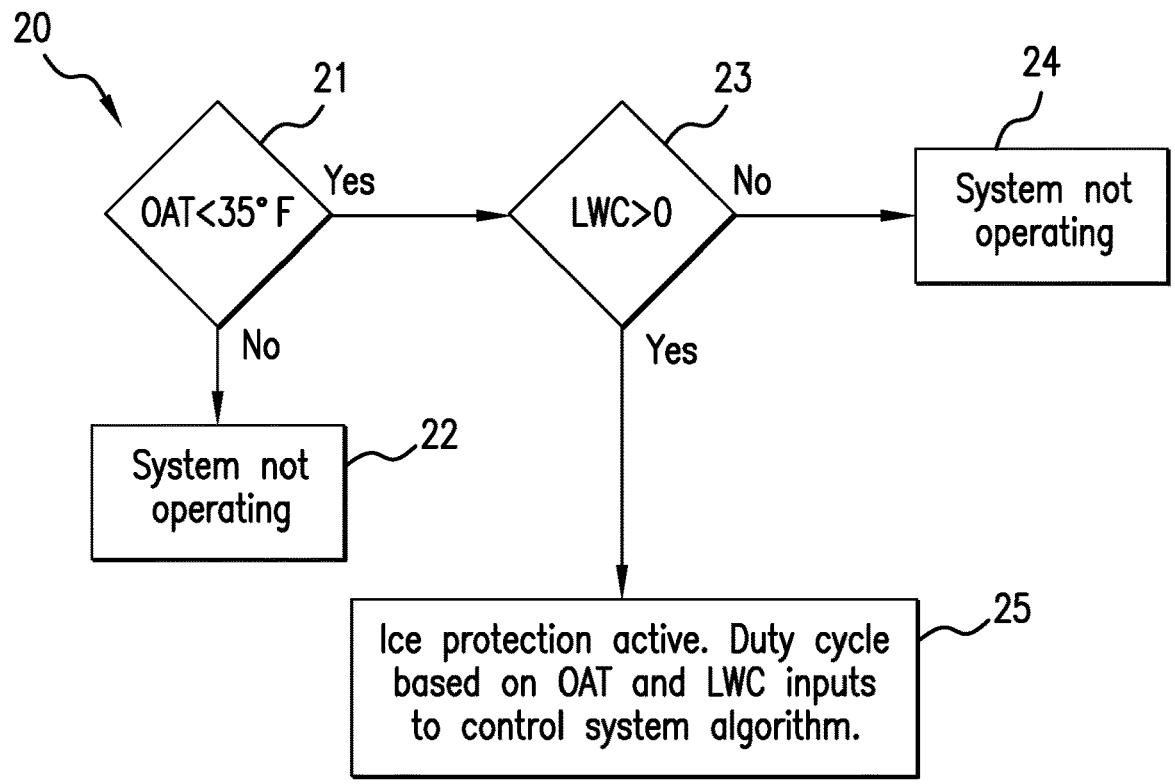
FIG. 1B is process flow chart depicting a second embodiment an ice protection system of the prior art.

FIG. 1B is a process flow chart depicting an ice protection system of the prior art that does not use a surface temperature detector, but instead uses inputs of OAT and LWC to control the electrical power delivered to electrothermal devices (not shown). Shown in FIG. 1B are OAT and LWC ice protection flowchart 20, and the following steps: OAT decision step 21, system not operating step 22, LWC decision step 23, system not operating step 24, and system operating with duty cycle step 25. The description of OAT decision step 21, system not operating step 22, LWC decision step 23, and system not operating step 24 is substantially the same as that provided above in regard to FIG. 1A. In system operating with duty cycle step 25, the ice protection system uses an algorithm that calculates the duty cycle of the electrical power delivered to electrothermal devices on the protected surface. The effective power that is delivered to the electrothermal devices is established by repeatedly energizing and de-energizing the electrothermal devices as determined by the calculation of duty cycle. The ice protection system uses inputs of OAT and LWC to calculate the duty cycle, with the algorithm for any particular embodiment being dependent on several factors. Typically, an icing wind tunnel (IWT) test facility can be used to calibrate a particular algorithm for a particular embodiment. An IWT test facility can also be referred to as a wind tunnel test facility.

Referring again to FIG. 1B, it can be seen that when LWC is not present (i.e., LWC=0), the ice protection system will not be operating regardless of OAT. For example, when an aircraft having an ice protection system utilizing OAT and LWC ice protection flowchart 20 is operating in an environment where OAT is significantly below the freezing point of water, sudden icing can occur when moving from an area of zero LWC to an area of high LWC. Under this exemplary scenario, the ice protection system will respond by invoking system operating with duty cycle step 25. However, under some conditions, the ice protection system may not be able to control the initial build-up of ice, thereby allowing a period of time to elapse before the ice buildup is controlled. This can be undesirable is some situations.

Figure 2:
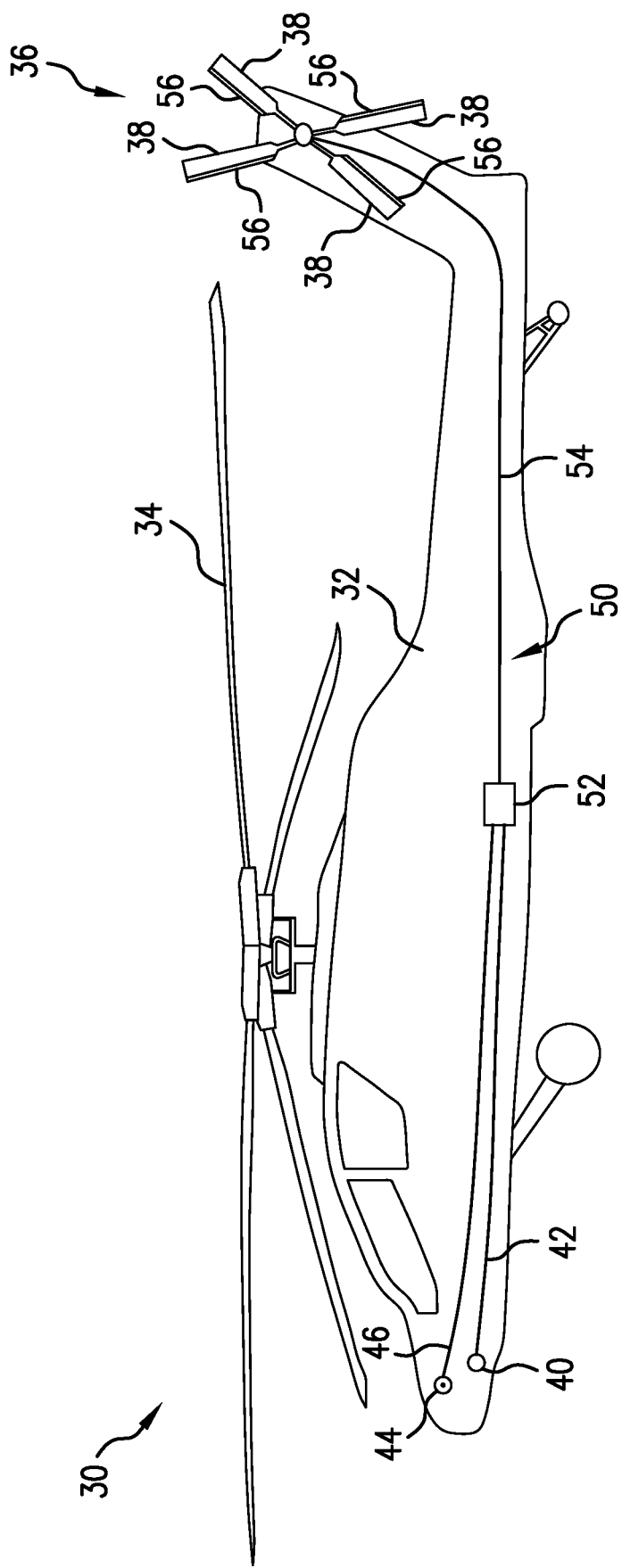
FIG. 2 is a schematic diagram of an aircraft with an aircraft ice protection control system.

FIG. 2 is a schematic diagram of the aircraft ice protection control system of the present disclosure in an exemplary aircraft. Shown in FIG. 2 are aircraft 30, fuselage 32, main rotor 34, tail rotor 36, rotor blade 38, OAT sensor 40, OAT signal line 42, LWC detector 44, LWC signal line 46, ice protection system 50, controller 52, electrothermal device cable 54, and electrothermal devices 56. In the illustrated embodiment, aircraft 30 is a rotary-wing aircraft (i.e., helicopter and the like) having fuselage 32. Main rotor 34 helps aircraft 30 fly by providing vertical lift, and tail rotor 36 helps stabilize and control the direction of aircraft 30 during flight. In the illustrated embodiment, tail rotor 36 includes four rotor blades 38. Aircraft 30 can include multiple sensors, including OAT sensor 40 and LWC detector 44. OAT sensor 40 transmits the measured indication of OAT via OAT signal line 42, and LWC detector 44 transmits the measured indication of LWC via LWC signal line 44. Ice protection system 50 includes controller 52, electrothermal device cable 54, and electrothermal devices 56.

In the illustrated embodiment, controller 52 can be a hardware device for executing software, particularly software stored in memory. Controller 52 receives inputs of OAT and LWC via OAT signal line 42 and LWC signal line 44, respectively. Controller 52 also receives an electrical power input from an on-board power supply system (not shown), which provides power for controller 52 to operate while also providing electrical power for energizing electrothermal devices 56. It is to be appreciated that electrical power is supplied to electrothermal devices 56 via electrothermal device cable 54 along with other electrical components and connections that are known in the rotary-wing aircraft arts. Accordingly, these other electrical components and connections are not shown in FIG. 2. Electrothermal device 56 can also be referred to as a heater, because heat is generated as a result of the electrical power that is being provided to electrothermal device 56. In the illustrated embodiment, each rotor blade 38 includes a single electrothermal device 56. In some embodiments, each rotor blade 38 can include two or more electrothermal devices 56. Each electrothermal device 56 can have a relatively low profile (i.e., distance away from a protected surface), while covering a surface area on each rotor blade 38 (i.e., the protected surface). In some embodiments, each electrothermal device 56 can have a uniform power surface density (i.e., power dissipation per unit of area). In other embodiments, each electrothermal device 56 can have a patterned power surface density, with the power dissipation per unit of surface area varying across the protected surface. In the illustrated embodiment, electrothermal devices 56 are configured to operate at a particular voltage, and when energized, produce 100% power dissipation. Therefore, the power level delivered to electrothermal devices 56 is controlled by adjusting the duty cycle of the voltage being supplied to electrothermal devices 56 via electrothermal device cable 56. Accordingly, as used in this disclosure, controller 52 can be said to control the power level delivered to electrothermal devices 56, and/or to control the duty cycle. In other embodiments, other means can be used for controlling the power level delivered to electrothermal devices 56.

Figure 3A:
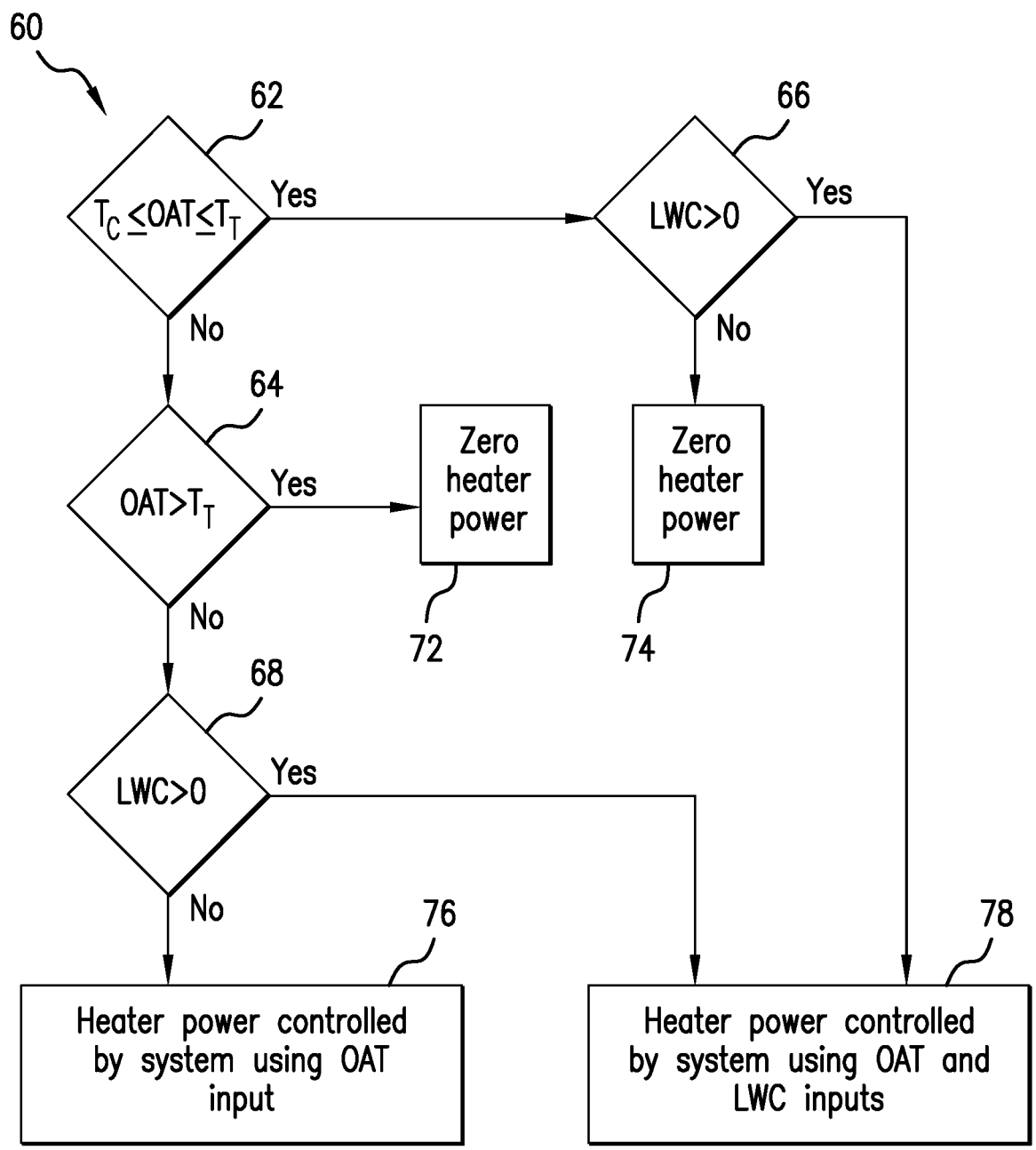
FIG. 3A is a process flow chart depicting the aircraft ice protection control system preheat logic.

FIG. 3A is a process flow chart depicting the aircraft ice protection control system preheat logic of ice protection system 50 shown in FIG. 2. In addition to OAT and LWC, two temperature values are also used in FIG. 3A: threshold temperature ($T_T$) and critical temperature ($T_C$). As used in this disclosure, threshold temperature can be written as either $T_T$ or TT (i.e., with or without subscript notation). Similarly, critical temperature can be written as either $T_C$ or TC. Shown in FIG. 3A are ice protection flowchart 60, and the following steps: first OAT decision step 62, second OAT decision step 64, first LWC decision step 66, second LWC decision step 68, zero heater power steps 72, 74, heater controlled using OAT step 76, and heater controlled using OAT and LWC step 78. During operation, ice protection system 50 receives inputs of OAT and LWC as described above in regard to FIG. 2 and follows the program that is depicted in ice protection flowchart 60.

In a particular embodiment, values of threshold temperature (TT) and critical temperature (TC) are established for ice protection system 50 for a particular aircraft 30. Threshold temperature (TT) is the temperature below which ice accretion can occur on a surface in the presence of LWC. In the illustrated embodiment, threshold temperature (TT) is 35° F. (1.7° C.). In other embodiments, threshold temperature (TT) can be higher than 35° F. (1.7° C.). For example, in a particular embodiment, threshold temperature (TT) can be 38° F. (3.3° C.). In another embodiment, threshold temperature (TT) can be 41° F. (5° C.). In some embodiments, threshold temperature (TT) can be lower than 35° F. (1.7° C.). For example, in a particular embodiment, threshold temperature (TT) can be 34° F. (1.1° C.). It is to be appreciated that in most embodiments, threshold temperature (TT) will be within several degrees of the freezing point of water, but any threshold temperature (TT) is within the scope of the present disclosure.

Referring again to FIG. 3A, critical temperature (TC) is the temperature below which electrothermal devices 56 cannot control icing if energized when aircraft 30 encounters a high LWC environment. Critical temperature (TC) can be determined from calculations and/or empirically for a particular aircraft 30 under a particular set of operating conditions. Empirical data can come from icing wind tunnel testing and also in situ during actual flight of a particular aircraft 30. Numerous factors can influence the determination of critical temperature, with non-limiting examples including the power dissipation surface density of electrothermal devices 56, the available power budget, the altitude and/or expected altitude of operation, and the speed and/or expected speed of operation. In a particular embodiment, critical temperature (TC) can be a constant value for ice protection system 50. In another embodiment, critical temperature (TC) can be calculated by controller 52 based on the input of flight parameters and/or parameters that are entered by an operator. Accordingly, a particular critical temperature (TC) can vary over a wide range of temperatures. In a particular embodiment, critical temperature (TC) can be very close to threshold temperature. As a non-limiting example, threshold temperature (TT) can be 35° F. (1.7° C.) and critical temperature (TC) can be 32° F. (0° C.). In other embodiments, critical temperature (TC) can be much lower than threshold temperature. As a non-limiting example, threshold temperature (TT) can be 35° F. (1.7° C.) and critical temperature (TC) can be −20° F. (−28.9° C.). Any critical temperature (TC) is within the scope of the present disclosure, and any method of determining critical temperature (TC) is also within the scope of the present disclosure.

Referring again to FIG. 3A, in first OAT decision step 62, OAT is compared against both TC and TT. If (TC≤OAT≤TT) is not true (i.e., OAT<TC or OAT>TT) then second OAT decision step 64 is invoked. In second OAT decision step 64, OAT is compared against threshold temperature. If OAT>TT, then zero heater power step 72 is invoked, meaning that zero power (i.e., 0% duty cycle) is provided to electrothermal devices 56 via electrothermal device cable 54. However, in second OAT decision step 64, if OAT<TT, then second LWC decision step 68 is invoked.

Referring again to first OAT decision step 62, if (TC≤OAT<TT) is true (i.e., TC≤OAT≤TT), then first LWC decision step 66 is invoked. In first LWC decision step 66, if (LWC>0) is not true (i.e., LWC=0), then zero heater power step 74 is invoked, meaning that zero power (i.e., 0% duty cycle) is provided to electrothermal devices 56 via electrothermal device cable 54. However, in first LWC decision step 66, if LWC>0, then heater controlled using OAT and LWC step 78 is invoked, meaning that controller 52 determines the power level to be provided to electrothermal devices 56 via electrothermal device cable 54 based on the input values of OAT and LWC.

Referring again to second LWC decision step 68, if LWC>0, then heater controlled using OAT and LWC step 78 is invoked (i.e., as described above). However, in second LWC decision step 68, if (LWC>0) is not true (i.e., LWC=0), then heater controlled using OAT step 76 is invoked, meaning that controller 52 determines the power level to be provided to electrothermal devices 56 via electrothermal device cable 54 based on the input value of OAT. Heater controlled using OAT step 76 can also be referred to as protected surface preheat, meaning that electrothermal devices 56 on rotor blades 38 (i.e., protected surfaces) are receiving electrical power, thereby preheating rotor blades 38. Therefore, when aircraft 30 encounters a high LWC environment, ice protection system 50 can overcome ice accretion on rotor blades 38 (i.e., protected surfaces). Accordingly, controller 52 can be said to apply ice protection control system preheat logic.

During operation of ice protection system 50, controller 52 receives inputs of OAT and LWC from OAT sensor 40 via OAT signal line 42, and from LWC detector 44 via LWC signal line 46, respectively. Controller 52 can also receive other inputs from other sensors, systems, and or input devices aboard aircraft 30. Controller 52 repeatedly applies the logic of ice protection flowchart 60 shown in FIG. 3. In each of the action steps shown in FIG. 3 (i.e., zero heater power steps 72, 74, heater controlled using OAT step 76, and heater controlled using OAT and LWC step 78), controller 52 provides the determined power level (i.e., duty cycle) to electrothermal devices 56 so-indicated, while repeatedly reevaluating the environment of aircraft 30 by starting over at first OAT decision step 62. In some embodiments, controller 52 can perform ice protection flowchart 60 continuously or nearly-continuously. In other embodiments, controller 52 can use a system clock (i.e., stepping signal) that invokes ice protection flowchart 60 after a period of time has elapsed (i.e., an evaluation period). In these other embodiments, the evaluation period can range from microseconds to minutes, or longer. In some embodiments, the evaluation period can be synchronized to other timing periods aboard aircraft 30. For example, in a particular embodiment, LWC detector 44 can operate on a periodic measurement cycle, and controller 52 can be synchronized with the periodic measurement cycle of LWC detector 44.

Figure 3B:
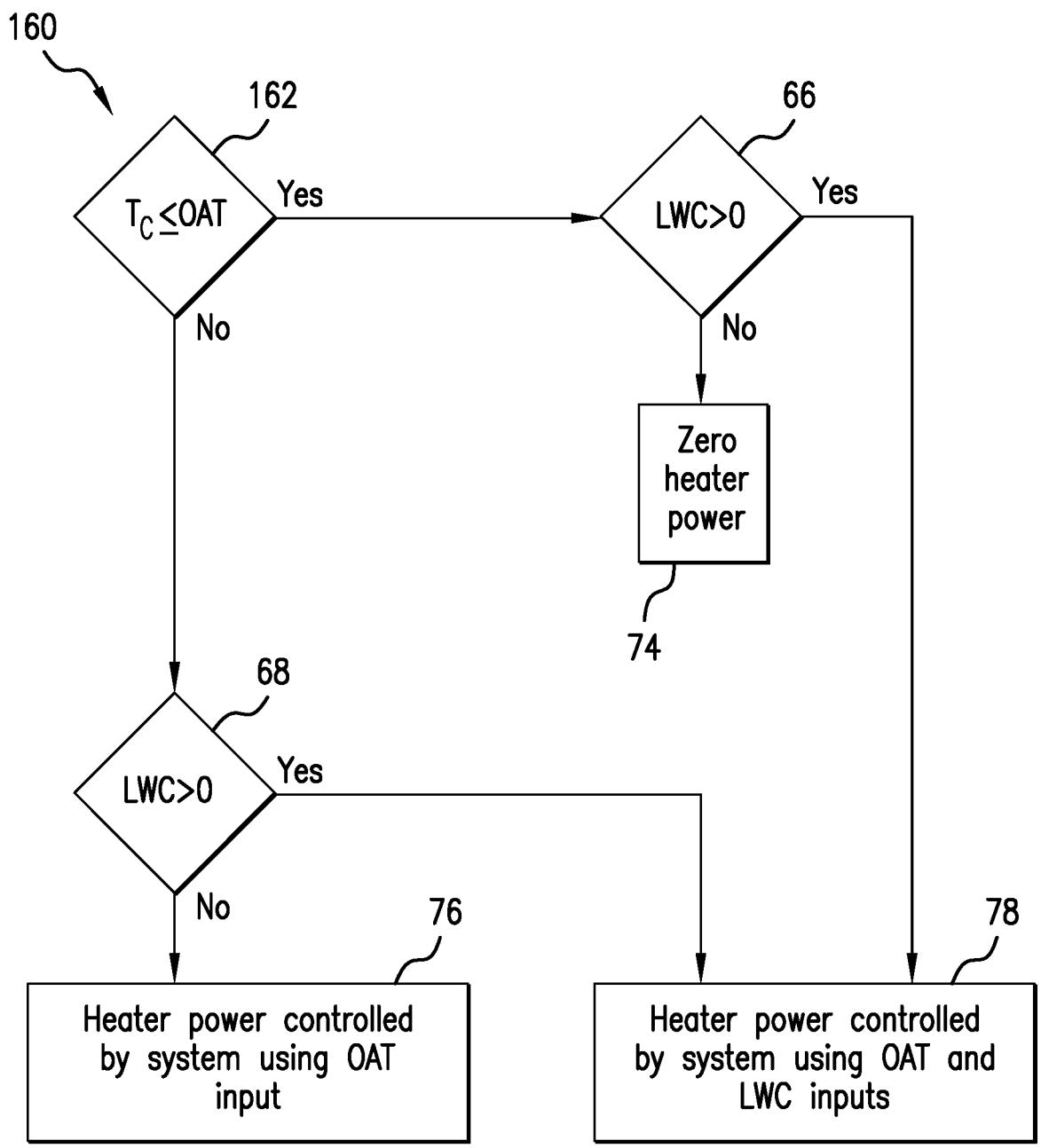
FIG. 3B is a process flow chart depicting a second embodiment of the aircraft ice protection control system preheat logic

FIG. 3B is a process flow chart depicting a second embodiment of the aircraft ice protection control system preheat logic of ice protection system 50 shown in FIG. 2. Shown in FIG. 3B are ice protection flowchart 160, and the following steps: first OAT decision step 162, first LWC decision step 66, second LWC decision step 68, zero heater power step 74, heater controlled using OAT step 76, and heater controlled using OAT and LWC step 78. The description of ice protection flowchart 160 is substantially the same as that described above in regard to FIG. 3A, with the exception that threshold temperature (TT) is not used as an input. In first OAT decision step 162, OAT is compared against TC. If (TC≤OAT) is not true (i.e., OAT<TC) then second LWC decision step 68 is invoked. However, if (TC≤OAT) is true (i.e., TC≤OAT), then first LWC decision step 66 is invoked.

Figure 4:
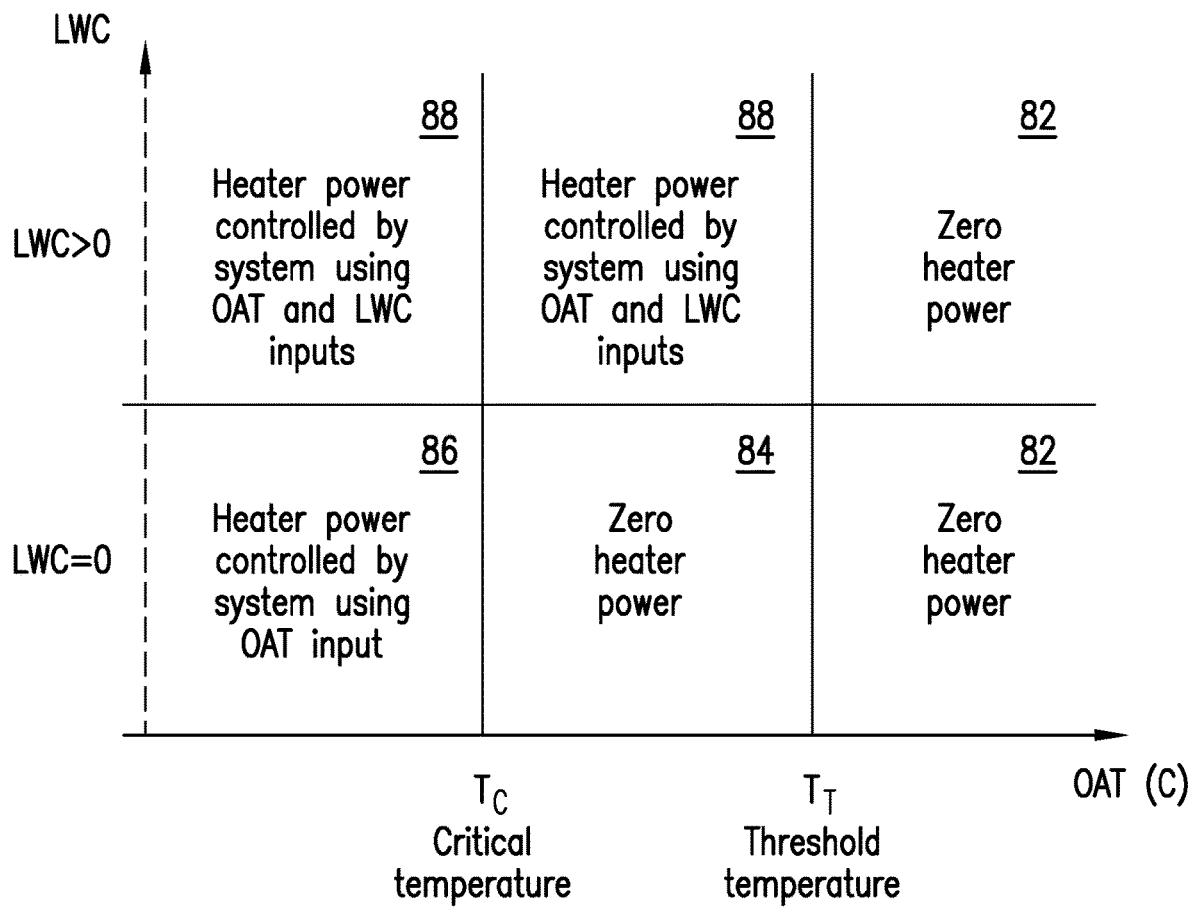
FIG. 4 is a logic diagram of the aircraft ice protection control system preheat logic of FIG. 3A.

FIG. 4 is a logic diagram of the aircraft ice protection control system preheat logic of FIG. 2. Accordingly, FIG. 4 is a logic diagram (i.e., truth table) that illustrates ice protection flowchart 60 shown in FIG. 3A. Shown in FIG. 4 are ice protection system logic diagram 80, and the following regions along a horizontal temperature axis: zero heater power region 82, 84, heater controlled using OAT region 86, and heater controlled using OAT and LWC region 88. The aforementioned regions correspond to the following process steps described above in regard to FIG. 3, respectively: zero heater power steps 72, 74, heater controlled using OAT step 76, and heater controlled using OAT and LWC step 78. Particular note is to be made of heater controlled using OAT region 86, which exists when LWC=0 and OAT≤TC.

The logic diagram shown in FIG. 4 is easily modified to depict ice protection flowchart 160 shown in FIG. 3B by merely removing the notation of threshold temperature (TT) and both zero heater power regions 82.

Figure 5:
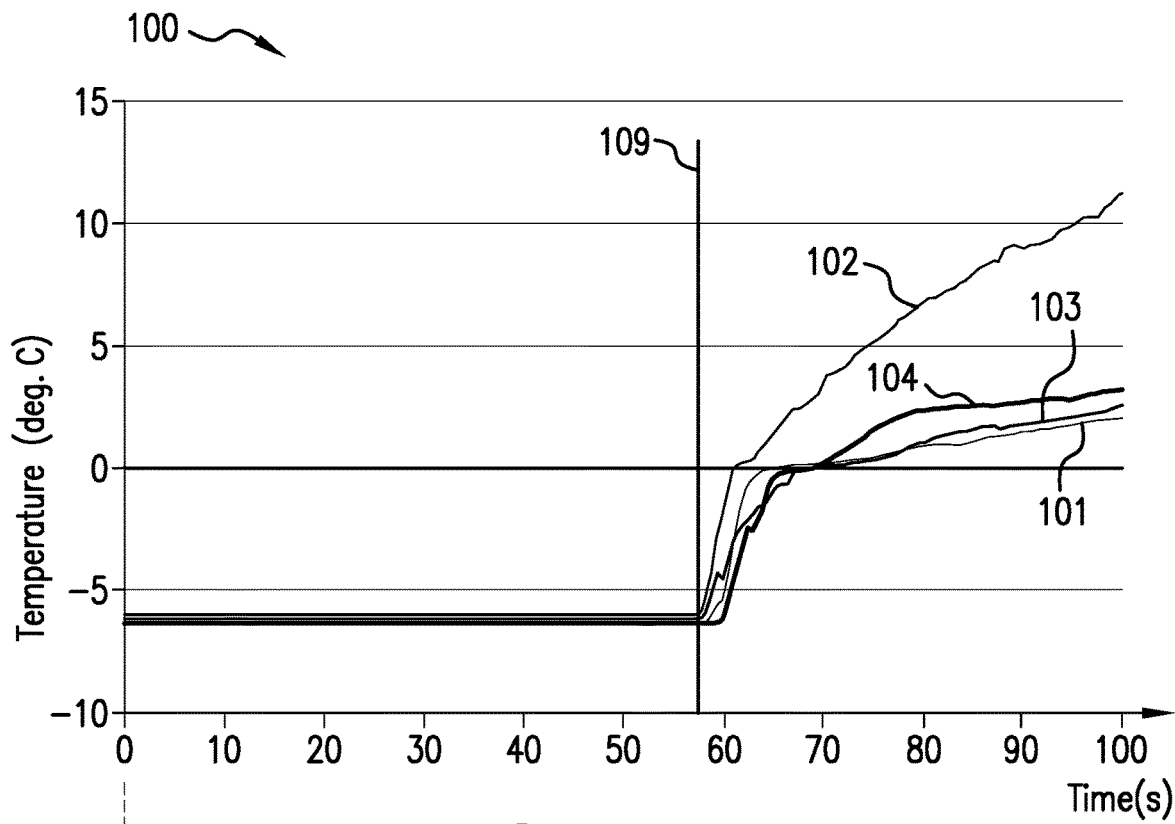
FIG. 5 is a graph depicting the temperature at measurement points on a rotor blade over time using the ice protection system of the prior art depicted in FIG. 1B.

FIG. 5 is a graph depicting the temperature at measurement points on rotor blade 38 over time using the ice protection system of the prior art depicted in FIG. 1B It is to be appreciated that rotor blade 38 was removed from aircraft 30 shown in FIG. 2 for conducting the experiment described in FIG. 5, using an ice protection system of the prior art. Moreover, FIG. 5 is presented on a common time axis with FIG. 6 to enable a comparison to be easily be made between the ice protection system of the prior art and that of the present disclosure. FIG. 5 depicts the results of an experimental run using OAT and LWC ice protection flowchart 20 of the prior art shown in FIG. 1B, whereby electrothermal device 56 on rotor blade 38 is only powered when OAT<35° F. (1.7° C.) and LWC>0.

FIG. 5 depicts the experimental temperature measurements made by four temporarily-installed RTD temperature probes positioned at various external points on rotor blade 38. The four temperature probes were affixed using pressure sensitive adhesive tape on these combinations of the following external locations on rotor blade 38: an upper and lower position, and a leading and trailing edge. Shown in FIG. 5 are temperature time graph 100, and the following temperature plots: upper position trailing edge 101, upper position leading edge 102, lower position leading edge 103, and lower position trailing edge 104. Also shown in FIG. 5 is LWC introduction 109.

The environmental testing conditions that existed for the experiment depicted in FIG. 5 included a temperature (i.e., OAT) of −9.2° C. (15.4° F.) in an icing wind tunnel test facility with a wind speed of 80.5 m/s (264 ft/s). Initially, LWC=0. At approximately 58 s, LWC density of 0.95 g/m³ is introduced at LWC introduction 109. An LWC density of 0.95 g/m³ is considered heavy, and can result in rapid ice accretion on unprotected surfaces at a temperature below the freezing point. Prior to LWC introduction 109, steady state conditions exist on all temperature probes, with actual differences being caused by experimental error and the like as a result of temporarily affixing the RTD temperature probes.

At LWC introduction 109, the ice protection system of the prior art senses LWC>0 and responds by applying power to electrothermal device 56 on rotor blade 38. However, ice accretion began at LWC introduction 109 because the surface temperatures on rotor blade 38 are below the freezing point (i.e., 0° C.). Internal and external temperatures on rotor blade 38 begin to rise in response to the application of power to the electrothermal device 56, but remain below freezing for a measurable period of time during which ice build-up on rotor blade 38 continues. In particular, ice accretion continues until the surface temperature of external points (i.e., at upper position trailing edge 101, upper position leading edge 102, lower position leading edge 103, and lower position trailing edge 104) rises above the melting point. The researchers observed that considerable ice buildup was visible on many portions of rotor blade 38 during this time, with an ice thickness ranging from about 0.015-0.030 in. (0.38-0.76 mm). It took between 8-20 seconds for the various measurement points to shed the built-up ice by surface melting.

Figure 6:
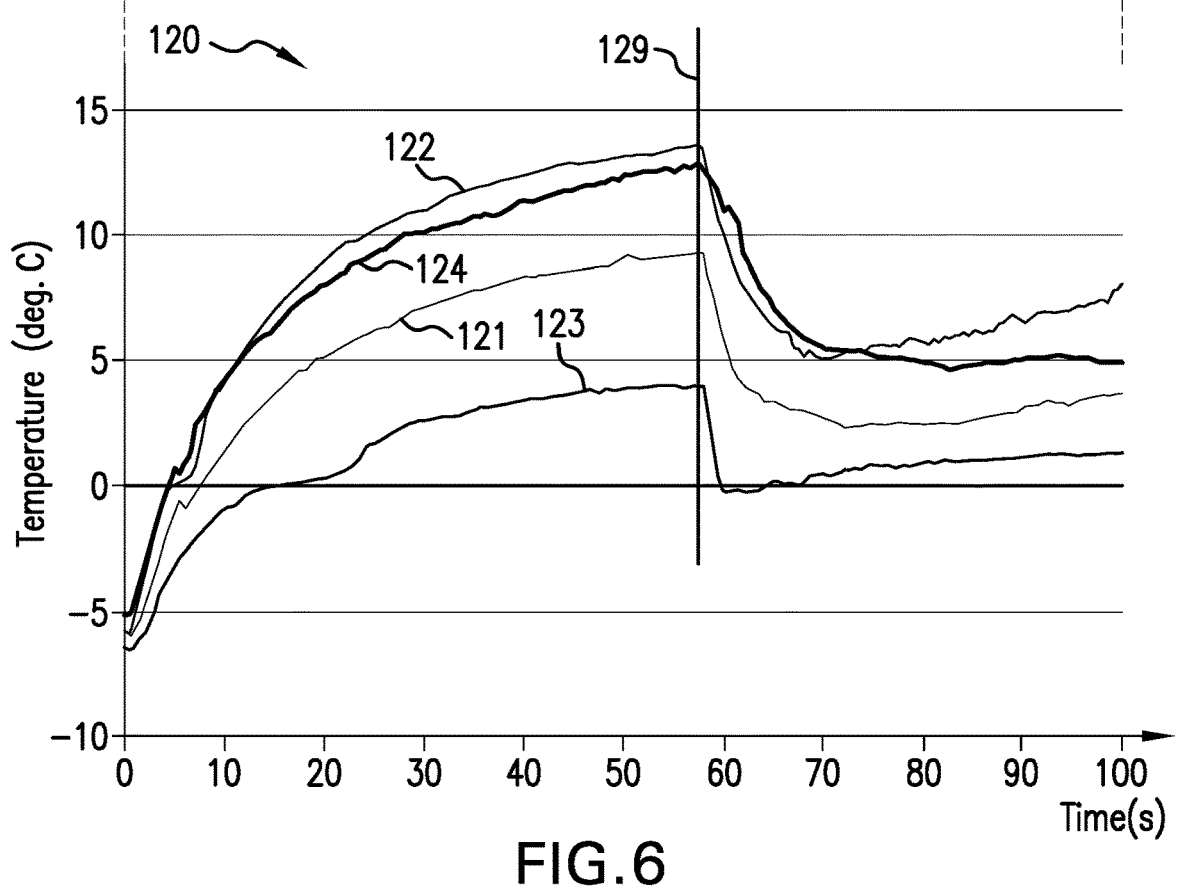
FIG. 6 is a graph depicting the temperature at measurement points on a rotor blade over time using the aircraft ice protection control system preheat logic of FIG. 3.

FIG. 6 is a graph depicting the temperature at measurement points on rotor blade 38 over time using ice protection system 50 of FIG. 2 (i.e., ice protection flowchart 60 shown in FIG. 3). Experimental rotor blade 38 and the temperature probe locations were the same as those described above in regard to FIG. 5. Shown in FIG. 6 are preheat logic temperature time graph 120, and the following temperature plots: upper position trailing edge 121, upper position leading edge 122, lower position leading edge 123, and lower position trailing edge 124. Also shown in FIG. 6 is LWC introduction 129. FIG. 6 depicts the results of an experimental run using ice protection flowchart 60 shown in FIG. 3A, using ice protection system 50 described above in regard to FIG. 2. The environmental conditions were the same as those described above in regard to FIG. 5 (i.e., OAT about −9.2° C. (15.4° F.) in an icing wind tunnel test facility with a wind speed 80.5 m/s (264 ft/s)). Initially, LWC=0, LWC density of 0.95 g/m³ is introduced at LWC introduction 129, occurring at approximately 58 s (i.e., just as in the experiment described above in regard to FIG. 5). For the experiment depicted in FIG. 6, the critical temperature (TC) was −4.7° C. (22.5° F.). In other words, OAT was less than critical temperature (TC) (i.e., OAT<TC). Accordingly, when the experiment began (i.e., at time=0), ice control system 50 invoked heater controlled using OAT step 76 of FIG. 3A. In other words, ice protection system 50 utilized ice protection control system preheat logic to preheat the surfaces of rotor blade 38 by supplying a power level (i.e., duty cycle) to electrothermal device 56. Accordingly, the measured temperature of each temperature probe begins to increase during the first 60 seconds. It is to be noted that the experimental results depicted in FIG. 6 would be identical if ice protection flowchart 160 shown in FIG. 3B were instead applied to controller 52 in ice protection system 50, because OAT<TC, thereby initiating a preheating of the surfaces of rotor blade 38 by supplying a power level (i.e., duty cycle) to electrothermal device 56.

As can be seen in FIG. 6, all temperature measurement points are above the freezing point just prior to LWC introduction 129. At LWC introduction 129, a marked reduction is sensed by all temperature probes as a result of ice accretion on rotor blade 38. It is also noted that at LWC introduction 129, controller 52 receives the input of LWC>0, causing second LWC decision step 68 to invoke heater controlled using OAT and LWC step 78. As a result, controller 52 responds by supplying a greater power level (i.e., higher duty cycle) to electrothermal device 56, thereby helping mitigate the reduction in surface temperatures. It is to be noted that upper position trailing edge 121, upper position leading edge 122, and lower position trailing edge 124 remain above the freezing point following LWC introduction 129. The temperature probe for lower position leading edge 123 measures a temperature below the freezing point for only a brief period, as shown in FIG. 6. The researchers observed that minimal ice was visible on rotor blade 38 following LWC introduction 129.

In the experiment depicted in FIG. 6, controller 52 was configured to allow minimal ice accretion following LWC introduction 129. It can be seen from preheat logic temperature time graph 120 that if the preheat period were extended beyond 60 seconds before LWC is introduced at LWC introduction 129, all temperature positions would continue to increase, thereby potentially resulting in an even lesser buildup of ice and/or preventing a buildup of ice on rotor blade 38 following LWC introduction 129.

In some embodiments, a measurable amount of ice accretion can be tolerable on a protected surface. In other embodiments, it can be important to minimize or prevent ice accretion on a protected surface. Accordingly, in designing and configuring ice protection system 50, the period of time that any portion of a protected surface is allowed to drop below a particular temperature can be adjusted by the selection of critical temperature, the power level (i.e., duty cycle) supplied to electrothermal devices 56, the available power budget, and/or other factors. Accordingly, the determination of critical temperature (TC) and/or threshold temperature (TT) can affect the ice accretion that occurs when aircraft 30 encounters LWC in the environment. It is to be appreciated higher values of critical temperature (TC) and/or threshold temperature (TT) can result in greater electrical power being dissipated by electrothermal devices 56. In the embodiment illustrated in FIG. 3A, power dissipation by electrothermal devices 56 is determined by the duty cycle being delivered by controller 52. In other embodiments, electrothermal devices 56 can have either a larger or a smaller power rating (i.e., maximum power dissipation per unit of surface area), and will therefore have an accordingly larger or smaller power dissipation per unit of surface area for a particular duty cycle.

Figure 7:
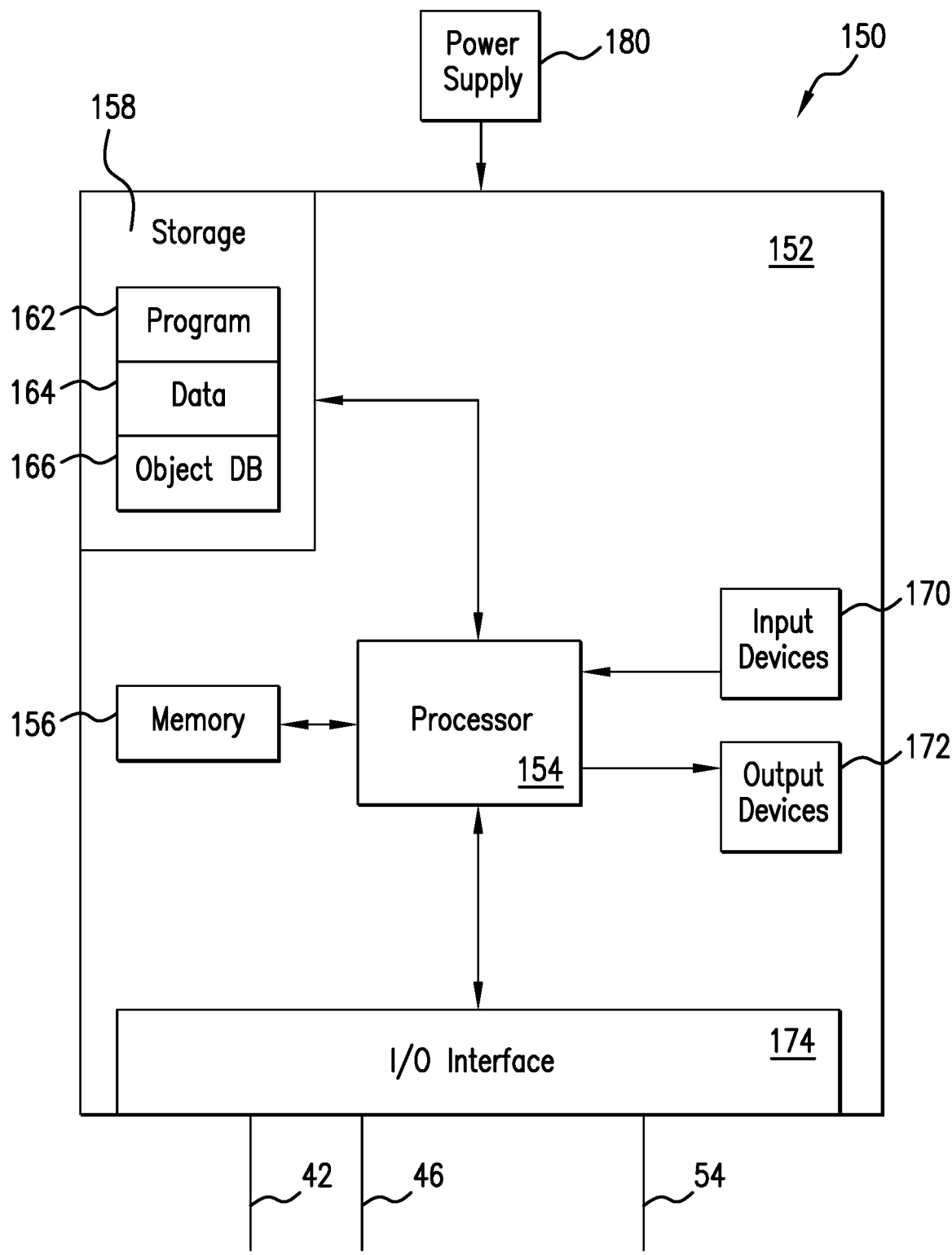
FIG. 7 is a schematic diagram of a controller in the aircraft ice protection control system of FIG. 2.

FIG. 7 is a schematic diagram of an exemplary implementation of controller 52 in ice protection system 50 of FIG. 2. Reference numerals for ice protection system 50 and controller 52 are incremented by 100 for the exemplary implementation shown in FIG. 7. Shown in FIG. 7 are ice protection system 150, controller 152, processor 154, memory 156, storage 158, program storage 162, data storage 164, object database 166, input devices 170, output devices 172, input/output (I/O) interface 174, and power supply 180. Also shown in FIG. 7 are OAT signal line 42, LWC signal line 46, and electrothermal device cable 54, as were shown and described above in regard to FIG. 2. In the embodiment depicted in FIG. 7, controller 152 includes processor 154, memory 156, storage 158, input devices 170, output devices 172, and I/O interface 174. Controller 152 can also be called an electronic control system. Processor 154 can be a hardware device for executing software, particularly software stored in memory. Processor 154 can be a custom made or commercially available processor, a central processing unit (CPU), an auxiliary processor among several processors associated with the computing device, a semiconductor-based microprocessor (in the form of a microchip or chip set), or generally any device for executing software instructions.

Memory 156 can include any one or combination of volatile memory elements, e.g., random access memory (RAM, such as DRAM, SRAM, SDRAM, VRAM, etc.) and/or nonvolatile memory elements, e.g., ROM, hard drive, tape, CD-ROM, etc. Moreover, memory 156 can incorporate electronic, magnetic, optical, and/or other types of storage media. Note that memory 156 can also have a distributed architecture, where various components are situated remotely from one another, but can be accessed by the processor. The software in memory 154 may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within memory 156. Storage 158 includes program storage 162, data storage 164, and object database 166.

Storage 158 can include any one or combination of volatile storage elements, e.g., random access memory (RAM, such as DRAM, SRAM, SDRAM, VRAM, etc.) and/or nonvolatile storage elements, e.g., ROM, hard drive, tape, CD-ROM, etc. Moreover, storage 156 can incorporate electronic, magnetic, optical, and/or other types of fixed and/or removable storage media. Program storage 162 can include executable instructions that when loaded into memory 156 by processor 154 cause processor to perform the operation of ice protection system 150 described above (i.e., ice protection system 50 described above in regard to FIGS. 2 and 3A-3B). Operational data can be stored as data 164, and other object data can be stored in object DB 166. When controller 152 is in operation, processor 154 can be configured to execute software stored within memory 156, to communicate data to and from memory 156 and/or to and from storage 158, and to generally control operations of controller 152 pursuant to the software. Software in memory 156, in whole or in part, is read by processor 154, perhaps buffered within processor 154, and then executed.

Input devices 170 can include various input devices, for example but not limited to, a keyboard, mouse, scanner, microphone, camera, proximity device, etc. Output devices 172 can include various output devices, for example but not limited to, a printer, display, a speaker, lights, etc. I/O interface 174 receives an input of OAT via OAT sensor line 42, and an input of LWC via LWC sensor line 46. I/O interface 174 supplies power to electrothermal devices 56 via electrothermal device cable 54. I/O interface 174 can further transfer data to and from devices that communicate both as inputs and outputs, for instance but not limited to, a modulator/demodulator (modem) for accessing another device, system, or network; a radio frequency (RF) or other transceiver; or a telephonic interface, bridge, router, etc.

I/O interface 174 can include, for example but not limited to, one or more buses and/or other wired or wireless connections (not shown). The additional connections can each have additional elements, which are omitted for simplicity, such as other controllers, buffers (caches), drivers, repeaters, and receivers to enable communications. Further, the local interface may include address, control, and/or data connections to enable appropriate communications among the aforementioned components.

Power supply 180 provides electrical power to controller 152. In the illustrated embodiment, power supply 180 provides one or more regulated voltages to controller 152 for the operation of components included therein. The one or more regulated voltages can be similar to those used aboard aircraft 30 for other electronics systems. Power supply 180 also provides electrothermal device power to controller 152 for use by electrothermal devices 56. In a typical embodiment, the electrothermal device power can be three-phase AC power that is delivered by controller 152 to electrothermal devices 56. In other embodiments, electrothermal device power can be either DC, or single- or two-phase AC power.

The implementation of ice protection system 50 of the present disclosure was described in the context of a rotor blade. All surfaces, whether fixed or movable, on any type of aircraft are within the scope of the present disclosure. Non-limiting examples include windshields, main rotor blades, tail rotor blades, fixed wings, horizontal and vertical stabilizers, engine inlets, nose cones, inlet guide vanes, instrumentation, and control surfaces.

Discussion of Possible Embodiments

The following are non-exclusive descriptions of possible embodiments of the present invention.

A method of supplying power from an electronic control system to an electrothermal device on an aircraft surface to control icing on the aircraft surface, the method comprising: determining a critical temperature (TC) at or below which an anti-icing system will be used to preheat the aircraft surface; sensing an outside air temperature with an outside air temperature (OAT) sensor; detecting an outside liquid water content (LWC) with an LWC detector; and supplying electrical power having a calculated power level to the electrothermal device under control of the electronic control system, the calculated power level being: zero, if: OAT>TC; and LWC=0; controlled based on OAT and LWC, if: OAT>TC; and LWC>0; controlled based on OAT and LWC, if: OAT<TC; and LWC>0; and controlled based on OAT, if: OAT<TC; and LWC=0.

The method of the preceding paragraph can optionally include, additionally and/or alternatively, any one or more of the following features, configurations and/or additional components:

A further embodiment of the foregoing method, wherein the power level is controlled by controlling a duty cycle of the supplied electrical power.

A further embodiment of the foregoing method, further comprising: determining a threshold temperature (TT) above which the anti-icing system will not be used; and calculating zero power level if OAT>TT.

A further embodiment of the foregoing method, wherein TT is about 1.7° C. (35° F.).

A further embodiment of the foregoing method, wherein TC is determined based on testing performed in a wind tunnel test facility.

A further embodiment of the foregoing method, wherein TC is determined based on an available power budget.

A further embodiment of the foregoing method, wherein the surface is on a rotary blade A further embodiment of the foregoing method, wherein the OAT sensor is mounted remotely from the electrothermal device; and the LWC detector is mounted remotely from the electrothermal device.

A further embodiment of the foregoing method, further comprising repeatedly performing the method.

A further embodiment of the foregoing method, further comprising performing the method in response to a stepping signal.

An ice protection system for controlling icing on an aircraft surface, comprising: an OAT sensor, configured to provide a signal indicative of an OAT; a LWC detector, configured to provide a signal indicative of a LWC; an electrothermal device, disposed on the aircraft surface; and an electronic control system, configured to: determine a critical temperature (TC) at or below which an anti-icing system will be used to preheat the aircraft surface; and supply an electrical power having a calculated power level to the electrothermal device, the calculated power level being: zero, if: OAT>TC; and LWC=0; controlled based on OAT and LWC, if: OAT>TC; and LWC>0; controlled based on OAT and LWC, if: OAT<TC; and LWC>0; and controlled based on OAT, if: OAT<TC; and LWC=0.

The ice protection system of the preceding paragraph can optionally include, additionally and/or alternatively, any one or more of the following features, configurations and/or additional components:

A further embodiment of the foregoing ice protection system, wherein the power level is controlled by controlling a duty cycle of the supplied electrical power.

A further embodiment of the foregoing ice protection system, further comprising: determining a threshold temperature (TT) above which the anti-icing system will not be used; and calculating zero power level if OAT>TT.

A further embodiment of the foregoing ice protection system, wherein TT is about 1.7° C. (35° F.).

A further embodiment of the foregoing ice protection system, wherein determining TC comprises receiving a value of TC determined from testing performed in a wind tunnel test facility.

A further embodiment of the foregoing ice protection system, wherein TC is determined based on an available power budget.

A further embodiment of the foregoing ice protection system, wherein the surface is on a rotary blade A further embodiment of the foregoing ice protection system, wherein the OAT sensor is mounted remotely from the electrothermal device; and the LWC detector is mounted remotely from the electrothermal device.

A further embodiment of the foregoing ice protection system, wherein the electronic control system is configured to repeatedly calculate the power level.

A further embodiment of the foregoing ice protection system, wherein the electronic control system is configured to repeatedly calculate the power level in response to a stepping signal.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of supplying power from an electronic control system to an electrothermal device on an aircraft surface to control icing on the aircraft surface, the method comprising:

determining a critical temperature (TC) at or below which an anti-icing system will be used to preheat the aircraft surface;

sensing an outside air temperature with an outside air temperature (OAT) sensor;

detecting an outside liquid water content (LWC) with an LWC detector;

calculating a power level using the electronic control system; and supplying electrical power having the calculated power level to the electrothermal device under control of the electronic control system, the calculated power level being:
zero, if:
OAT>TC; and
LWC=0;
controlled based on OAT and LWC, if:
OAT>TC; and
LWC>0;
controlled based on OAT and LWC, if:
OAT≤TC; and
LWC>0; and
controlled based on OAT, if:
OAT≤TC; and
LWC=0.

2. The method of claim 1, wherein the power level is controlled by controlling a duty cycle of the supplied electrical power.

3. The method of claim 1, further comprising:
determining a threshold temperature (TT) above which the anti-icing system will not be used; and
calculating zero power level if OAT>TT.

4. The method of claim 3, wherein TT is about 1.7° C. (35° F.).

5. The method of claim 1, wherein TC is determined based on testing performed in a wind tunnel test facility.

6. The method of claim 1, wherein TC is determined based on an available power budget.

7. The method of claim 1, wherein the surface is on a rotary blade.

8. The method of claim 1, wherein:
the OAT sensor is mounted remotely from the electrothermal device; and
the LWC detector is mounted remotely from the electrothermal device.

9. The method of claim 1, further comprising repeatedly performing the method.

10. The method of claim 9, further comprising performing the method in response to a stepping signal.

11. An ice protection system for controlling icing on an aircraft surface, comprising:
an outside air temperature (OAT) sensor, configured to provide a signal indicative of an OAT;
a liquid water content (LWC) detector, configured to provide a signal indicative of a LWC;
an electrothermal device, disposed on the aircraft surface;
an electronic control system, configured to:
determine a critical temperature (TC) at or below which an anti-icing system will be used to preheat the aircraft surface; and
supply an electrical power having a calculated power level to the electrothermal device, the calculated power level being:
zero, if:
OAT>TC; and
LWC=0;
controlled based on OAT and LWC, if:
OAT>TC; and
LWC>0;
controlled based on OAT and LWC, if:
OAT≤TC; and
LWC>0; and
controlled based on OAT, if:
OAT≤TC; and
LWC=0.

12. The ice protection system of claim 11, wherein the power level is controlled by controlling a duty cycle of the supplied electrical power.

13. The ice protection system of claim 11, wherein the electronic control system is further configured to:
determining a threshold temperature (TT) above which the anti-icing system will not be used; and
calculate zero power level if OAT>TT.

14. The ice protection system of claim 13, wherein TT is about 1.7° C. (35° F.).

15. The ice protection system of claim 11, wherein determining TC comprises receiving a value of TC determined from testing performed in a wind tunnel test facility.

16. The ice protection system of claim 11, wherein TC is determined based on an available power budget.

17. The ice protection system of claim 11, wherein the surface is on a rotary blade.

18. The ice protection system of claim 11, wherein:
the OAT sensor is mounted remotely from the electrothermal device; and
the LWC detector is mounted remotely from the electrothermal device.

19. The ice protection system of claim 11, wherein the electronic control system is configured to repeatedly calculate the power level.

20. The ice protection system of claim 19, wherein the electronic control system is configured to repeatedly calculate the power level in response to a stepping signal.

* * * * *